United States Patent
Ding et al.

(10) Patent No.: US 11,195,329 B2
(45) Date of Patent: Dec. 7, 2021

(54) TERRAIN MODELING METHOD THAT FUSES GEOMETRIC CHARACTERISTICS AND MECHANICAL CHARACTERISTICS AND COMPUTER READABLE STORAGE MEDIUM THEREOF

(71) Applicant: Harbin Institute of Technology, Haerbin (CN)

(72) Inventors: Liang Ding, Haerbin (CN); Zongquan Deng, Haerbin (CN); Ruyi Zhou, Haerbin (CN); Haibo Gao, Haerbin (CN); Wenhao Feng, Haerbin (CN); Peng Xu, Haerbin (CN); Nan Li, Haerbin (CN); Zhen Liu, Haerbin (CN)

(73) Assignee: HARBIN INSTITUTE OF TECHNOLOGY, Haerbin (CN)

( * ) Notice: Subject to any disclaimer, the term of this patent is extended or adjusted under 35 U.S.C. 154(b) by 29 days.

(21) Appl. No.: 16/826,326

(22) Filed: Mar. 23, 2020

(65) Prior Publication Data
US 2020/0402300 A1 Dec. 24, 2020

(30) Foreign Application Priority Data
Jun. 21, 2019 (CN) .......................... 201910544272.0

(51) Int. Cl.
*G06T 17/05* (2011.01)
*G06T 7/11* (2017.01)
(Continued)

(52) U.S. Cl.
CPC ............ *G06T 17/05* (2013.01); *G06K 9/6289* (2013.01); *G06N 3/08* (2013.01); *G06N 7/005* (2013.01);
(Continued)

(58) Field of Classification Search
CPC . G06T 17/05; G06T 7/11; G06T 2207/10024; G06T 2207/10028;
(Continued)

(56) References Cited

U.S. PATENT DOCUMENTS

2013/0300740 A1* 11/2013 Snyder .................... G06F 3/016
345/420
2015/0371431 A1* 12/2015 Korb .................. G06K 9/00208
382/113
(Continued)

*Primary Examiner* — Todd Buttram

(57) ABSTRACT

A terrain modeling method that fuses geometric characteristics and mechanical characteristics, and a terrain modeling system are provided in the present invention. The method includes steps of: obtaining color images and depth images of the detected region, performing a terrain semantic segmentation on the color images, and fusing ground semantic information obtained by the semantic segmentation and depth information contained in the depth images at the same time to generate the point clouds; mapping the point clouds to a raster map in a map coordinate system to generate corresponding rasters, and updating the elevation values to the corresponding rasters; and calculating the input images in terms of terra-mechanical characteristics, and updating calculation results to the corresponding rasters to generate a terrain model. A mechanical characteristic parameter is added to a terrain factor, and terrain characteristics are innovatively performed from two dimensions of geometric characteristic and mechanical characteristics.

18 Claims, 5 Drawing Sheets

(51) Int. Cl.
*G06N 3/08* (2006.01)
*G06N 7/00* (2006.01)
*G06K 9/62* (2006.01)

(52) U.S. Cl.
CPC ...... *G06T 7/11* (2017.01); *G06T 2207/10024* (2013.01); *G06T 2207/10028* (2013.01); *G06T 2207/20084* (2013.01); *G06T 2207/30244* (2013.01)

(58) Field of Classification Search
CPC ...... G06T 2207/20084; G06T 2200/08; G06K 9/6289; G06K 2209/40; G06N 7/005; G06N 3/0454
See application file for complete search history.

(56) References Cited

U.S. PATENT DOCUMENTS

2019/0080431 A1* 3/2019 Choi .......................... G06T 5/50
2020/0402300 A1* 12/2020 Ding ....................... G06T 17/05

* cited by examiner

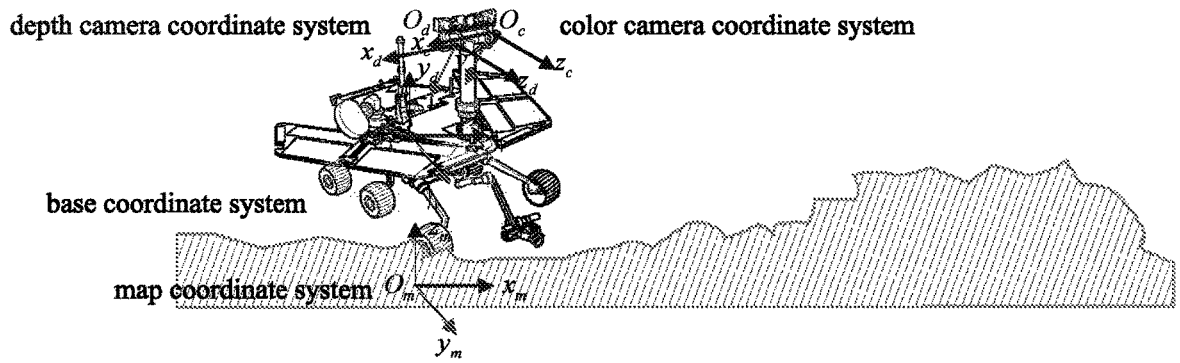
Fig. 5
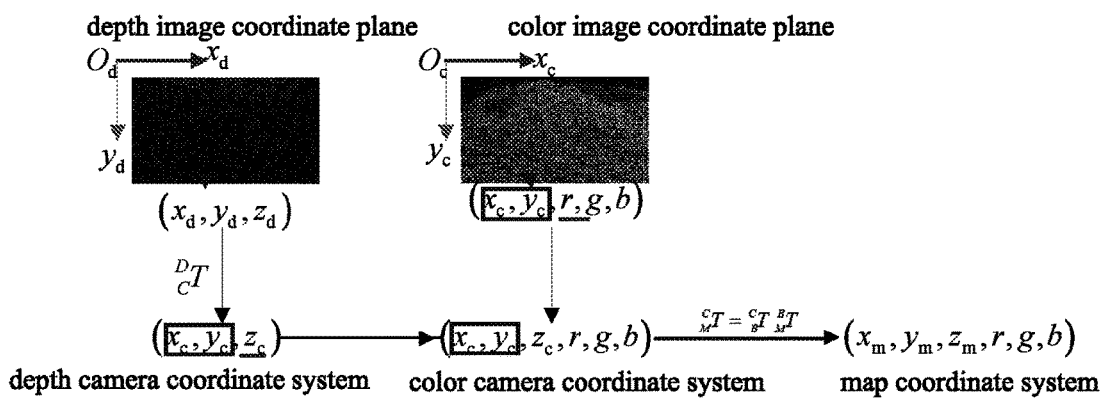
Fig. 6
| XYZ | RGB | label1 | label2 | label3 | confidence1 | confidence2 | confidence3 |
(a)
| XYZ | RGB | label | confidence |
(b)
Fig. 7

TERRAIN MODELING METHOD THAT FUSES GEOMETRIC CHARACTERISTICS AND MECHANICAL CHARACTERISTICS AND COMPUTER READABLE STORAGE MEDIUM THEREOF

BACKGROUND OF THE INVENTION

Field of the Invention

The present invention relates to the technical field of environmental modeling, and in particular, to a terrain modeling method that fuses geometric characteristics and mechanical characteristics, a computer readable storage medium, and a terrain modeling system thereof.

Description of Related Art

With the development and advancement of science and technology, mankind has begun to carry out scientific exploration research on other planets. However, with the increasing requirements for planetary exploration missions and the increasingly-complex detection environment, the simple terrain geometric information cannot meet the needs of planet rovers to adapt to the environment. For example, due to rugged surface with soft sand in the surface of Mars, the planet rover has repeatedly experienced subsidence or slippage due to the non-geometric characteristics of the ground, which has hindered the smooth operation of detection activities. It can be seen that the terra-mechanical characteristics have become an important factor affecting the motion state of the planet rover.

The terrain map, as a concentrated expression of the terrain information, has provided an environmental basis for multiple mission links. To plan a safer accessible path, design a more environment-adaptively control strategy and perform higher-fidelity motion simulation, terra-mechanical theory with terra-mechanical parameters as known conditions on the basis of a wheel-ground interaction model has penetrated into more and more task links. Therefore, it is an urgent need to propose a terrain model including geometric characteristics and mechanical characteristics and a construction method therefor, so as to ensure that terra-mechanics-based methods can be reliably applied.

According to the above-mentioned defects, the inventor has finally obtained the present invention through a long period of research and practice.

SUMMARY OF THE INVENTION

In order to solve the above technical defects, the technical solution adopted by the present invention is to provide a terrain modeling method that fuses geometric characteristics and mechanical characteristics, which includes steps of: obtaining input images of a detected region, and processing the input images to generate point clouds comprising elevation values of the input images; mapping the point clouds to a raster map in a map coordinate system to generate corresponding rasters, and updating the elevation values to the corresponding rasters; and calculating the input images in terms of terra-mechanical characteristics, and updating calculation results to the corresponding rasters to generate a terrain model.

In one embodiment, the step of obtaining input images of a detected region and processing the input images to generate point clouds includes: obtaining color images and depth images of the detected region, performing a terrain semantic segmentation on the color images, and fusing ground semantic information obtained by the semantic segmentation and depth information contained in the depth images at the same time to generate the point clouds.

In one embodiment, the step of performing a terrain semantic segmentation on the color images includes: collecting terrain images as a data source, annotating a target terrain in the collected terrain images and generating corresponding mask labels, and randomly dividing the annotated terrain images into training sets and validation sets in proportion; calculating a mean and a variance of three RGB channels of the training sets, respectively, performing a data normalization on each of the input images, performing a data enhancement on original images in the training sets, and correcting the corresponding mask labels; and constructing a convolutional neural network, performing a training on a semantic segmentation model, and selecting a model with the highest accuracy as the semantic segmentation model for performing the terrain semantic segmentation on the color images.

In one embodiment, the semantic information includes a plurality of terrain types with a higher confidence obtained after the terrain semantic segmentation and corresponding probabilities.

In one embodiment, the step of fusing ground semantic information obtained by the semantic segmentation and depth information contained in the depth images at the same time to generate the semantic point clouds includes: combining the semantic information of each pixel in the color images with the depth information contained in the depth images at the same time; and performing a coordinate transformation using pose information of a camera carried by a planet rover to generate the semantic point clouds in the map coordinate system.

In one embodiment, the step of performing a coordinate transformation using pose information of a camera carried by a planet rover to generate the semantic point clouds in the map coordinate system includes: mapping three-dimensional point clouds in a depth camera coordinate system to a color camera coordinate system at the same time to form color three-dimensional point clouds in the color camera coordinate system; and transforming the color three-dimensional point clouds into the map coordinate system via a planet rover base coordinate system.

In one embodiment, the color camera coordinate system and the depth camera coordinate system are fixedly connected to a planet rover body, and the planet rover base coordinate system changes with changes in poses of the planet rover and has a projection of a coordinate origin on an XY plane of the map coordinate system coinciding with a origin of the map coordinate system.

In one embodiment, the step of mapping the point clouds to a raster map in a map coordinate system to generate corresponding rasters, and assigning the elevation values to the corresponding rasters includes: updating the elevation values and the semantic information contained in the rasters through a data fusion when the point clouds at different times correspond to the same raster.

In one embodiment, the elevation values are updated by obtaining an average value of the elevation values contained in the plurality of point clouds.

In one embodiment, the step of updating the semantic information through a data fusion includes: updating the terrain types contained in the plurality of point clouds and the probabilities through Bayesian updating rule.

In one embodiment, the step of updating the semantic information through a data fusion includes: remaining the updated terrain types and a corresponding updated probability being an average of the two probabilities if the corresponding types of the maximum probability of the two semantic point clouds are the same; and remaining the terrain types with a larger probability as the updated terrain types and a corresponding updated probability being a times the corresponding larger probability if the corresponding types of the maximum probability of the two semantic point clouds are different.

In one embodiment, the step of estimating the input images in terms of terra-mechanical characteristics, and updating calculation results to the corresponding rasters to generate a terrain model includes: fitting a distribution function according to statistical data of the terra-mechanical characteristics; and performing a numerical estimation of the terra-mechanical characteristics with safety factors in combination with the semantic information, and assigning estimation results to the corresponding rasters to generate the terrain model.

In one embodiment, the step of performing a numerical calculation of the terra-mechanical characteristics with safety factors in combination with the semantic information includes:

calculating safety factors $S(K_s)$ of equivalent stiffness modulus $K_s$ and safety factors $S(\varphi)$ of equivalent friction modulus $\varphi$, respectively:

$$S(K_s) = \sum_i c_i F_i(K_s), S(\varphi) = \sum_i c_i F_i(\varphi);$$

wherein $c_i$ represents a confidence level corresponding to the i-th terrain category in the terrain semantic segmentation results, $F_i(K_s)$ represents a cumulative distribution function of the equivalent stiffness modulus, and $F_i(\varphi)$ represents a cumulative distribution function of the equivalent friction modulus.

In one embodiment, the step of estimating the input images in terms of terra-mechanical characteristics, and updating calculation results to the corresponding rasters to generate a terrain model includes: fitting a distribution function according to statistical data of the terra-mechanical characteristics; and performing a weighted calculation of values of the equivalent stiffness modulus and equivalent friction modulus of different terrain types according to the corresponding probabilities of the terrain types, and assigning calculation results to the corresponding rasters to generate the terrain model.

In one embodiment, the step of estimating the input images in terms of terra-mechanical characteristics, and updating calculation results to the corresponding rasters to generate a terrain model includes: fitting a distribution function according to statistical data of the terra-mechanical characteristics; and using a mean obtained by fitting as estimation values of the equivalent stiffness modulus and equivalent friction modulus, and assigning the estimation values to the corresponding rasters to generate the terrain model.

In one embodiment, the step of processing the input images includes: collecting terrain images as a data source, annotating a target terrain in the collected terrain images and generating corresponding mask labels, and randomly dividing the annotated terrain images into training sets and validation sets in proportion; calculating a mean and a variance of four RGBD channels in the training sets obtained after combination of the color images and the depth images, respectively, performing a data normalization on each of the input images, and performing an enhancement on original images in the training sets while correcting the corresponding mask labels; and constructing a convolutional neural network, performing a training on a semantic segmentation model, and selecting a model with the highest accuracy as the semantic segmentation model for performing a terrain semantic segmentation on the input images.

In one embodiment, the step of processing the input images to generate point clouds includes: emitting a laser light to a target region and receiving through a receiver to obtain point cloud data of the target region with three-dimensional coordinate information, and obtaining color images of the target region for combining with the point cloud data via coordinate transformation through semantic segmentation to generate the point clouds.

In one embodiment, the step of obtaining input images of a detected region and processing the input images to generate point clouds includes: obtaining color images and depth images of the detected region, and combining the color images with the depth images at the same time to generate the point clouds via coordinate transformation.

Compared with the prior art, the present invention has the beneficial effects of: providing a terrain modeling method fusing geometric characteristic and mechanical characteristics. Through a layered form, the terrain is innovatively characterized from the two dimensions of geometric and mechanical characteristics, and the terrain model is divided into a geometric characteristic layer and a mechanical characteristic layer according to different terrain features. Adding ground mechanics parameters to the terrain factor facilitates the use of wheel-ground interactions to perform motion simulation of planet cars.

In a second aspect, a computer readable storage medium is provided in the present invention. The computer readable storage medium stores a computer program. When the computer program is read and executed by a processor, it causes the terrain modeling method that fuses geometric characteristics and mechanical characteristics described above to be performed.

In a third aspect, a terrain modeling system is provided in the present invention. The terrain modeling system includes a memory, a processor, and a computer program stored on the memory and executable on the processor. When the program is executed by the processor, it causes the terrain modeling method that fuses geometric characteristics and mechanical characteristics described above to be performed.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a diagram of a map construction-related coordinate system according to an embodiment of the present invention.

FIG. 6 is a diagram of a transformation relationship between a coordinate map and a coordinate system according to an embodiment of the present invention.

FIG. 7 is a diagram of a data structure of a semantic point cloud according to an embodiment of the present invention.

DESCRIPTION OF THE PREFERRED EMBODIMENTS

The above and other technical features and advantages of the present invention are described in more detail below with reference to the drawings.

In terms of terrain perception, existing planetary environment models are usually presented in the form of Digital Elevation Model (DEM), which mainly reflects the geometric characteristics of the terrain. When in application, basic terrain factors such as slope, roughness, and undulation may be extracted by means of terrain statistical analysis to fuse multiple obstacle information for constructing a cost function of terrain accessibility, so as to reflect accessibility of the terrain. However, in actual planet environment, the planet rover may experience slippage and depression in the soft sand with a flat surface, but may climb safely through the hard rock pile with a raised surface. It can be seen that the terrain model containing only the geometric characteristics of the terrain may not fully reflect the soft and rugged nature of the terrain, may be already difficult to meet the information needs of the planet rover for environmental perception, and may not make better use of the mobile performance of the planet rover. Thus, existing map models and terrain non-geometric characteristics sensing methods have not reached a satisfactory level in terms of adaptability and accuracy for the planet rover.

Embodiment 1

Figure 1:
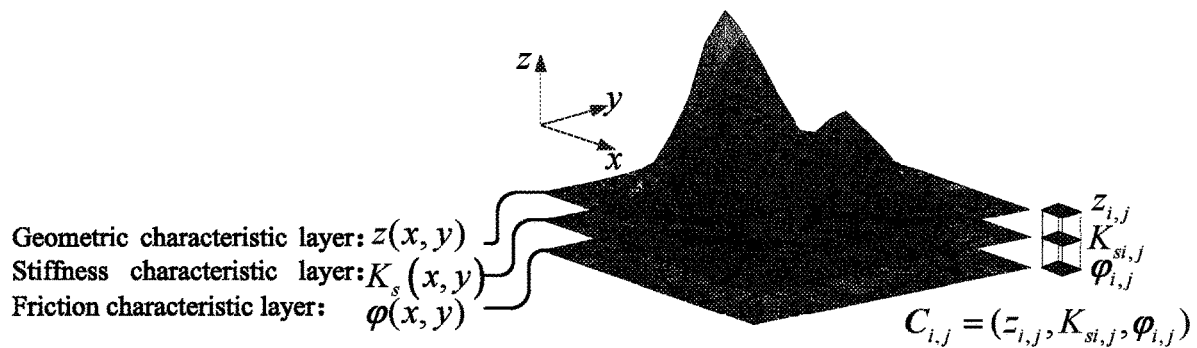
FIG. 1 is a diagram showing a construction of a terrain model according to an embodiment of the present invention.

FIG. 1 is a diagram showing a principle of constructing a terrain model according to an embodiment of the present invention. This model is a layered structure, which is composed of terrain geometric characteristic layer and mechanical characteristic layer. The geometric characteristic layer is used to represent the geometric characteristics of the terrain surface, which is represented by three-dimensional coordinates of the ground surface. The mechanical characteristic layer is used to represent the mechanical characteristics of the terrain surface, including stiffness characteristic layers and friction characteristic layers, which uses an equivalent stiffness modulus $K_s$ and an equivalent friction modulus of the ground $\varphi$, respectively, to characterize pressure characteristics in tangential direction and shear characteristics in tangential direction for the ground surface matrix. Therefore, the terrain model constructed by the present invention fuses the terrain geometric characteristics and mechanical characteristics, which may be represented as a continuous function of a ground surface elevation z, the equivalent stiffness modulus $K_s$ and the equivalent friction modulus $\varphi$ with respect to plane coordinates x, y. The elevation is the third dimensional coordinate in geospatial, and the equivalent stiffness modulus $K_s$ and the equivalent friction modulus $\varphi$ are the mechanical characteristics of the spatial coordinate point in the normal and tangential directions, respectively.

In one embodiment of the present invention, the corresponding terrain model is a discretized representation of a continuous model, expressed as a finite sequence including five terrain factors on a certain terrain region D:

$$\{C_i=(x_i,y_i,z_i,K_{si},\varphi_i), i=1,2,\ldots,N\};$$

wherein $(x_i,y_i)\in D$ represents the plane coordinate, and $z_i$, $K_{si}$, $\varphi_i$ represent the elevation value, the equivalent stiffness modulus vale and the equivalent friction modulus value corresponding to $(x_i,y_i)$. In particular, when the plane points of each vector in the sequence are arranged in a regular raster, the plane coordinate $(x_i,y_i)$ may be omitted, and at the same time the terrain model is simplified to a three-element vector sequence:

$$\{(z_i,K_{si},\varphi_i), i=1,2,\ldots,N\}.$$

Broadly speaking, the terrain model is characterized by a multi-channel tensor composed of regular surface raster cells. The cell of the i-th row and the j-th column in the regular raster is recorded as $C_{i,j}$, and each cell includes a plurality of terrain factors, i.e., the basic parameters of the ground surface matrix in terms of the geometric characteristics and mechanical characteristics. Therefore, the terrain factor in each cell may be expressed as $C_{i,j}=(G_{i,j},M_{i,j})$, wherein $G_{i,j}$ is the geometric factor expressed by the elevation value z, and $M_{i,j}$ represents mechanical factor associated with the cell of the i-th row and the j-th column. The number of factors in the cell is the same as the number of channels in the multi-channel tensor. The terrain model further includes other digital representations such as triangular rasters, and the geometric or mechanical characteristics of any point in the raster may be calculated by interpolation and other methods. The terrain geometric and mechanical factors in the terrain model are basic parameters for characterizing the geometric characteristics and mechanical characteristics of the terrain, playing a dominant role in characterization of the geometric characteristics and mechanical characteristics, and other terrain elements may also be derived directly or indirectly from these parameters. For example, the geometric elements may derive information such as slope and aspect, and mechanical elements may derive information such as wheel subsidence and wheel slip rate.

Figure 2:
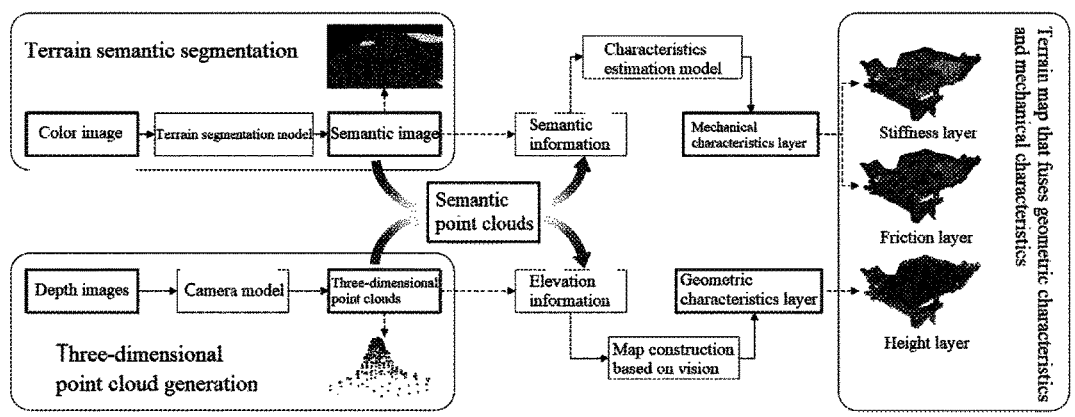
FIG. 2 is a diagram showing a terrain modeling method that fuses geometric characteristics and mechanical characteristics according to an embodiment of the present invention.
Figure 3:
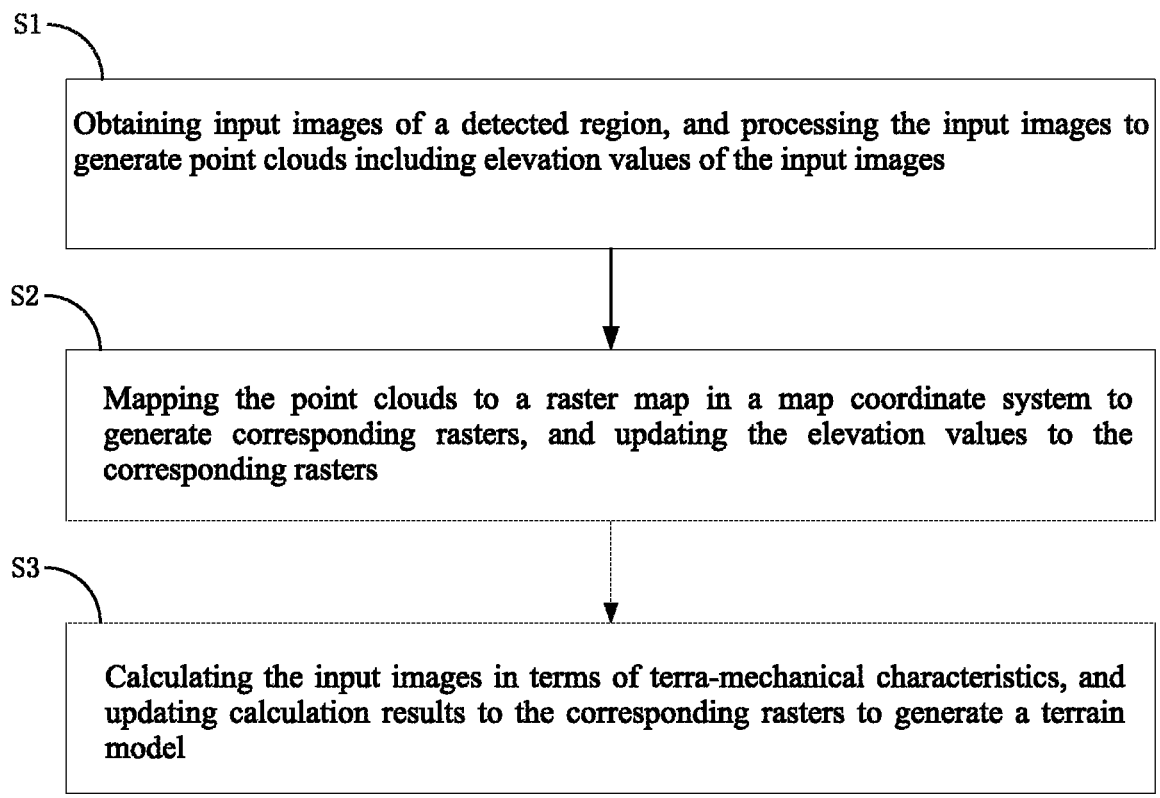
FIG. 3 is a flowchart of a terrain modeling method that fuses geometric characteristics and mechanical characteristics according to an embodiment of the present invention.

FIG. 2 is a diagram showing a terrain modeling method that fuses geometric characteristics and mechanical characteristics according to an embodiment of the present invention. FIG. 3 is a flowchart of a terrain modeling method that fuses geometric characteristics and mechanical characteristics according to an embodiment of the present invention, including steps S1 to S3. A specific embodiment 1 of the present invention will be described below with combination of FIGS. 2 and 3.

In the step S1, color image data and depth image data of a scene are obtained through a navigation camera, and the color image data and depth image data at the same time are processed by: performing a terrain semantic segmentation on the color images of a detected region, and fusing ground semantic information obtained by the semantic segmentation and depth information contained in the depth images, and mapping the semantic information of each pixel in two-dimensional images (that is, color images) to a three-dimensional coordinate system to generate the point clouds. In one embodiment of the present invention, the color image data flow and the depth image data flow are obtained by a RGB-D camera.

The terrain semantic segmentation for color images draws on the latest semantic segmentation research results in the field of computer vision. It performs a terrain classification for color images of the surrounding environment collected by the navigation camera through training a classifier based on machine learning algorithms by using a variety of terrains with significantly different mechanical characteristics as segmentation objects. That is to say, by loading the semantic segmentation model obtained by the learning training and inputting the original color images collected, pixel-level terrain classification results are outputted, i.e., the prediction results of each pixel are expressed as the probabilities that the pixel belongs to different types of terrain, wherein the sum of probabilities is 1.

Figure 4:
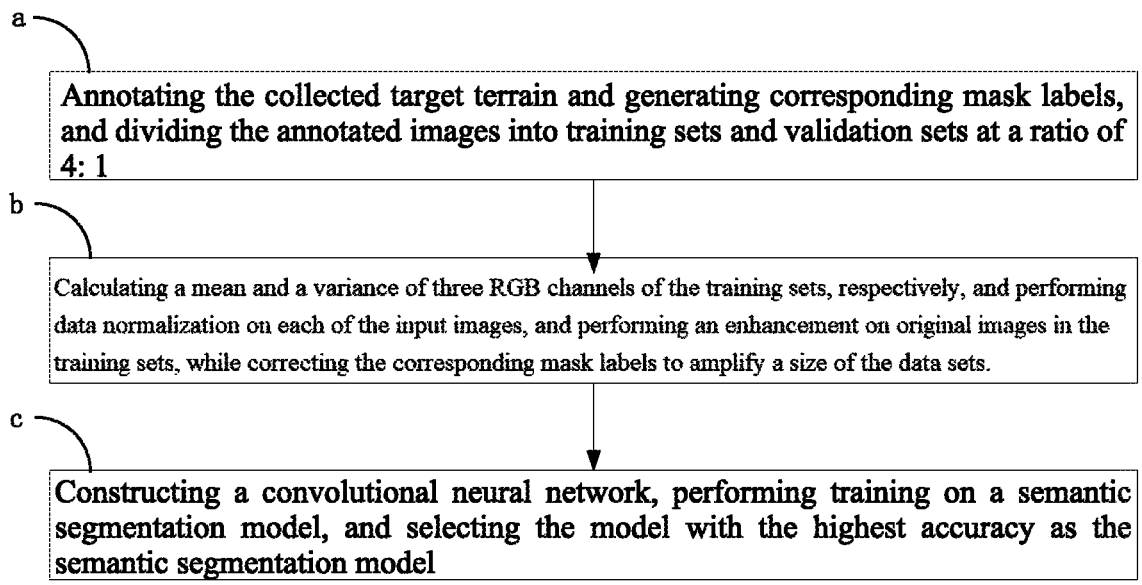
FIG. 4 is a flowchart of generating a semantic segmentation model according to an embodiment of the present invention.

The semantic segmentation model is generated based on a convolutional neural network (CNN) for a specific segmentation object. Type labels are obtained for each pixel of the input color images by the trained semantic segmentation model. In one embodiment of the present invention, the types of materials in the terrain environment are divided into sand, rock, gravel, bedrock, and unknown terrain. In other embodiments of the present invention, the types of materials in the terrain environment may be set to other different types, and are not limited to these. FIG. 4 is a flowchart of generating a semantic segmentation model according to an embodiment of the present invention, including a preparing step of training data, a pre-processing step of images, and a step of training model parameters, specifically shown as steps a to below:

Step a: Collecting terrain images as a data source by a planet rover vision system in a simulated terrain; annotating a target terrain including four basic types of sand, rock, gravel and bedrock in the collected images and generating corresponding mask labels, and labeling the remaining difficult-to-identify terrain as an unknown terrain; randomly dividing the annotated images into training sets and validation sets at a ratio of 4:1.

Step b: Calculating a mean and a variance of three RGB channels of the training sets, respectively, performing a data normalization on each of the input images, and performing an enhancement on original images in the training sets by a plurality of data enhancement methods such as random cropping, random flip, random rotation, random scaling, color bounce, noise disturbance, and blur enhancement, while correcting the corresponding mask labels to amplify a size of the data sets.

The step of correcting the corresponding mask labels specifically refers to that: the corresponding mask labels should also be cropped and corrected with the same size if the original color image is randomly cropped and enhanced; the corresponding mask labels should also undergo the same flip correction if the original color images are subjected to random flip enhancement; the corresponding mask labels should also undergo the same rotation correction if the original color images are subjected to random rotation enhancement; the corresponding mask labels should also be scaled and corrected at the same scale if the original color images are randomly scaled and enhanced; the corresponding mask labels will not change if the data enhancement of color bounce is performed on the original color images; the corresponding mask labels will not change if the noise disturbance and blur enhancement are performed on the original color images. The corresponding mask labels are also processed by sequentially superimposing corresponding correction methods if the plurality of data enhancement methods are randomly selected and may be superimposed on the original color images.

Step c: Constructing a convolutional neural network, and performing a training on a semantic segmentation model; loading weights of Pascal VOC pre-trained model to initialize the same feature layer, and performing weight initiation on different feature layers by using zero value; fine-tuning the raster parameters on the self-built training sets by the stochastic gradient descent method; training the model to convergence, and selecting the model with the highest accuracy as the semantic segmentation model by continuously adjusting the training parameters for terrain segmentation application.

The results of terrain semantic segmentation is combined with the depth images at the same time for obtaining three-dimensional coordinates for pixel points with respect to the plane images, i.e., the point clouds. The results of terrain semantic segmentation correspond to the point clouds one by one according to the x, y coordinates, thereby obtaining the point clouds of each pixel points with semantic information with respect to the camera coordinate system within a vision range. A coordinate transformation is performed using pose information of a camera to generate the semantic point clouds in the map coordinate system.

In one embodiment of the present invention, a relevant coordinate system is constructed as the map shown in FIG. 5. The color camera coordinate system $\Sigma_C$ and the depth camera coordinate system $\Sigma_D$ are fixedly connected to the planet rover body, and the planet rover base coordinate system $\Sigma_B$ changes with the change of the posture of the planet rover, but has a projection of a coordinate origin on an XY plane of the map coordinate system $\Sigma_M$ coinciding with a origin of the map coordinate system $\Sigma_M$. A transformation matrix between the color camera coordinate system $\Sigma_C$ and the depth camera coordinate system $\Sigma_D$ is recorded as $^D_C T$, a transformation matrix from the color camera coordinate system $\Sigma_C$ to the planet rover base coordinate system $\Sigma_B$ is recorded as $^C_B T$, and a transformation matrix from the planet rover base coordinate system $\Sigma_B$ to the map coordinate system $\Sigma_M$ is recorded as $^B_M T$. Each pixel in each frame of the color image data flow may be parsed into ($x_c$, $y_c$, R, G, B) data queue on the color image coordinate plane, and each pixel in each frame of the depth image data flow may be parsed into ($x_d$, $y_d$, $z_d$) data queue on the depth image coordinate plane The entire coordinate mapping process and the transformation relationship between the coordinate systems are shown in FIG. 6. First, the coordinates in the depth camera coordinate system $\Sigma_D$ are mapped to the color camera coordinate system $\Sigma_C$ with ($x_c$, $y_c$) as a clue to form color three-dimensional point clouds in the form of ($x_c$, $y_c$c, $z_c$, R, G, B) data in the color camera coordinate system. Then, the color three-dimensional point clouds are transformed to the map coordinate system $\Sigma_M$ by means of the planet rover base coordinate system $\Sigma_B$. The coordinate transformation between the depth camera coordinate system $\Sigma_D$ and the color camera coordinate system $\Sigma_C$ is as follows:

$$\begin{bmatrix} x_c \\ y_c \\ z_c \\ 1 \end{bmatrix} = {}_C^D T \begin{bmatrix} x_d \\ y_d \\ z_d \\ 1 \end{bmatrix}.$$

The transformation matrix from the color camera coordinate system $\Sigma_C$ to the map coordinate system $\Sigma_M$ is as follows:

$${}_M^C T = {}_B^C T {}_M^B T;$$

wherein ${}_C^D T, {}_B^C T$ 以及 ${}_M^B T$ are homogeneous transformation matrices between spatial coordinate systems, which may follow a unified expression:

$$T = \begin{bmatrix} R & P \\ 0 & 1 \end{bmatrix};$$

wherein R is 3×3 rotation matrix, representing a rotary transformation between two spatial coordinate systems; P is 3×1 translation vector, representing a translational transformation between two spatial coordinate systems.

If:

$${}_M^C T = \begin{bmatrix} n_x & o_x & a_x & p_x \\ n_y & o_y & a_y & p_y \\ n_z & o_z & a_z & p_z \\ 0 & 0 & 0 & 1 \end{bmatrix};$$

then, the three-dimensional coordinates $(x_m, y_m, z_m)$ in the map coordinate system $\Sigma_M$ may be transformed in the following manner:

$$\begin{bmatrix} x_m \\ y_m \\ z_m \\ 1 \end{bmatrix} = \begin{bmatrix} n_x & o_x & a_x & p_x \\ n_y & o_y & a_y & p_y \\ n_z & o_z & a_z & p_z \\ 0 & 0 & 0 & 1 \end{bmatrix} \begin{bmatrix} x_c \\ y_c \\ z_c \\ 1 \end{bmatrix}.$$

And then, color information associated with the $(x_c, y_c, z_c)$ coordinate points follows the coordinate transformation and corresponds to the $(x_m, y_m, z_m)$ coordinate points in the map coordinate system $\Sigma_M$ to form feature vectors $(x_m, y_m, z_m, R, G, B)$ in the map coordinate system $\Sigma_M$.

In one embodiment of the present invention, the semantic point clouds contain geometric and semantic information, which have data structures shown in FIG. 7(a), including geometric information, i.e., three-dimensional coordinate (XYZ), color information (RGB) of three RGB channels corresponding to the (R, G, B) feature vectors herein, and semantic information, i.e., belonged terrain type (label 1 to label 3) and corresponding confidence (confidence 1 to confidence 3). The semantic information are stored as the first several terrain types with the highest probabilities and the corresponding probabilities. In Embodiment 1, the first three terrain types with the highest probabilities in the five terrain types may be selected.

In one embodiment of the present invention, the terrain type may be illustratively divided into only five types. However, when the scene becomes complicated, for example, when various types of terrain, such as muddy soil and soil, have to be identified or when more detailed terrain segmentation is required such as distinguish between different grain sizes of sand (coarse and fine sand), rocks of different shapes (pointed and rounded rocks), rocks of different sizes (large and medium-sized rocks) and gravels of different materials (gravels of basalt and gravels of granite), the terrain type will increase accordingly. When the terrain type is increased to a certain number (for example, 20), the amount of data will be too large that the processing is difficult if all terrain types and the corresponding confidences are stored in the semantic point clouds. Meanwhile, only the first several terrain types with the highest confidences and the corresponding confidences are of saving significance, and confidences corresponding to the remaining terrains generally approaches zero such that saving them one by one is not of significance. Then, only saving the first several terrain types with the highest confidences and the corresponding confidences in the semantic point clouds will effectively reduce the amount of data storage and improve the computing efficiency.

In the step S2, mapping the semantic point clouds to a raster map in a map coordinate system to generate corresponding rasters; and assigning elevation values in the semantic point clouds to the corresponding rasters to form the geometric characteristic layer of the terrain model. The semantic point clouds at different times correspond to different visions, and new rasters are generated through coordinate mapping, thereby expanding the scope of the constructed raster map. The raster is a regular network formed by discretizing XY coordinates in the map coordinate system.

The elevation values and the semantic information contained in the rasters are updated through a data fusion when the plurality of semantic point clouds corresponds to the same raster. In one embodiment of the present invention, the elevation values contained in the plurality of semantic point clouds are fused by averaging, and the semantic types and their probabilities contained in plurality of semantic point clouds are fused by Bayesian update rules. The fusion results are subjected to normalization processing, and several types of terrain types with the highest probabilities and their corresponding probabilities are taken as the fusion results for being assigned to corresponding rasters as attributes. The fusion results of the semantic information are several types of terrain types and their corresponding probabilities, wherein the sum of their confidences is 1, and the corresponding terrain types are sorted according to the confidences for taking the terrain types with the highest confidences and their confidences as the fusion results, which are saved as the attributes of the corresponding rasters.

Since the rasters are obtained from the semantic point clouds by mapping, the data type of the semantic information recorded therein should be the same as that of the point clouds, i.e., each raster in a raster map also stores the same number of terrain types and their corresponding confidences according to the confidences if only several terrain types with the highest confidences and their corresponding confidences are stored in the semantic information of the semantic point clouds.

In the step S3, estimating terra-mechanical characteristics according to the semantic information, and generating a terrain model that fuses the terrain geometric characteristics and mechanical characteristics, specifically, fitting a distribution function according to statistical data of the mechanical characteristics, performing a numerical estimation of the terra-mechanical characteristics with safety factors in combination with the semantic information, and assigning estimation results to the corresponding rasters to generate mechanical characteristic layers of the terrain model. In combination of the geometric characteristic layers of the terrain model formed in the step 2, the terrain model that fuses the terrain geometric characteristics and mechanical characteristics as shown in FIG. 1 is constructed. The mechanical characteristic numeric value includes an equivalent stiffness characteristic value and an equivalent friction characteristic value.

Below is a statistics table of mechanical characteristics of an embodiment of invention:

| Terrain type | Equivalent stiffness modulus $K_s$ (Pa/m) | Equivalent friction modulus $\varphi$ (°) |
|---|---|---|
| $T_1$ | $K_{s1}$ | $\varphi_1$ |
| $T_2$ | $K_{s2}$ | $\varphi_2$ |
| ... | ... | ... |
| $T_i$ | $K_{si}$ | $\varphi_i$ |

Figure 8:
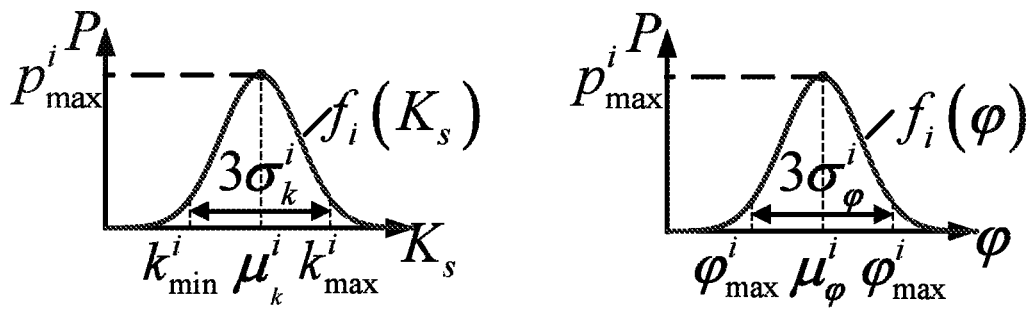
FIG. 8 is a diagram of fitting distribution functions based on statistical data of ground mechanical characteristics according to an embodiment of the present invention.

Each sample date includes three characteristic attributes: terrain type $T_i$, equivalent stiffness modulus $K_{si}$, equivalent friction modulus $\varphi_i$, wherein in the embodiment of the present invention, the terrain types are specifically sandy, gravel, rock, bedrock, and other terrain types. FIG. 8 is a diagram of distribution functions for fitting equivalent stiffness modulus and equivalent friction modulus corresponding to different terrain types, which is presented as the effect of further processing the above data table. Specifically, the step of processing includes first classifying the data of different terrain types, and then performing regression fitting on the mechanical characteristic data of the terrain types, to obtain a distribution function of mechanical characteristics for different terrain types. In one embodiment of the present invention, Gaussian function is used to fit the numerical distributions of the equivalent stiffness modulus $K_{si}$ and equivalent friction modulus $\varphi_i$ of the same terrain, and the fitting function is updated as the statistics change.

The step of obtaining the equivalent stiffness modulus $K_{si}$ and the equivalent friction modulus $\varphi_i$ specifically includes identifying the equivalent stiffness modulus $K_{si}$ and equivalent friction modulus $\varphi_i$ in a wheel-ground interaction model by means of iterative fitting with the aid of the wheel-ground interaction model according to the force and torque data of the wheel collected by a force sensor on the wheel during the travel of the planet rover. As the in-situ measurement continues, new identification results are added to the database as samples.

For each pixel, the pixel points obtained by the semantic segmentation belong to the confidence $c_i$ (i.e., probability) of the i-th type terrain $T_i$. In actual applications, the softer the terrain surface, the more vulnerable the planet rover is for sinking. Therefore, the smaller the stiffness based on the actual terrain type is, the smaller the predicted stiffness is, indicating that the predicted result is more conservative, and the safer the path planning or motion control of the planet rover based on the results. Specifically, assuming that the numerical characteristics of the equivalent stiffness modulus $K_s$ of each terrain show a certain probability distribution $f_i(K_s)$, an inferred safety may be represented by a cumulative distribution function $F_i(K_s)$ corresponding to the equivalent stiffness modulus and is expressed by a safety coefficient $S(K_s)$ if a predicted value of the equivalent stiffness modulus of the i-th type terrain $T_i$ is $K_s$. For the terrain classification results T, the safety coefficient $S(K_s)$ of its equivalent stiffness modulus $K_s$ may be inferred to be expressed as follows:

$$S(K_s) = \sum_i c_i F_i(K_s);$$

wherein $c_i$ represents a probability corresponding to the i-th type terrain in the terrain semantic segmentation results. Thus, when a safety coefficient S is given, it is not difficult to find a corresponding equivalent stiffness modulus $K_s$.

In one embodiment of the present invention, assuming that the equivalent stiffness modulus of a certain terrain has a Gaussian distribution $K_s \sim N(\mu_i, \sigma_i^2)$, the softness of the ground surface may be inferred as $K_s$, which has a corresponding safety coefficient $S(K_s)$ as follows:

$$S(K_s) = \sum_i c_i \Phi_i(K_s);$$

$$\Phi_i(K_s) = \frac{1}{2}\left[1 + erf\left(\frac{K_s - \mu_i}{\sigma_i \sqrt{2}}\right)\right];$$

wherein $\Phi_i(K_s)$ is the Gaussian error function, and the mean $\mu_i$ and the variance $\sigma_i^2$ may be obtained by sampling the terrain surface passed by the wheel of the planet rover multiple times to obtain the parameters Similarly, the same method may be used to infer the equivalent friction modulus corresponding to each pixel. Through the cumulative distribution function $F_i(\varphi)$ of the equivalent friction modulus of the i-th type terrain $T_i$, similarly, the given safety coefficient is calculated according to the formula below:

$$S(\varphi) = \sum_i c_i F_i(\varphi).$$

Thus, a corresponding equivalent friction modulus $\varphi$ may be found to be the characteristics value, representing a magnitude of the equivalent friction modulus with the safety coefficient S.

In Embodiment 1, the safety of the predicted results may be measured by setting the safety coefficient S, and an estimation of the ground mechanical characteristic parameters with a higher safety coefficient may be performed. When the estimation for the parameters of the equivalent stiffness modulus and the equivalent friction modulus corresponding to each of the rasters is obtained according to the given safety coefficient S, the mechanical characteristic parameters of the corresponding rasters may be obtained, so that the mechanical characteristic layers are formed after the estimation of the parameters for ground surface mechanical characteristics of all rasters is completed. Then, in combination of the geometric characteristic layers obtained in the step 2, the terrain model that fuses the terrain geometric characteristics and mechanical characteristics as shown in FIG. 1 is generated.

In other embodiments of the present invention, the functions of the stiffness modulus and the friction modulus are obtained by fitting in step 3, and the mean obtained by the fitting may be directly used as the estimated value of the equivalent stiffness modulus and the equivalent friction modulus. When the safety coefficient is taken as 0.5, the corresponding estimated values of the parameters are averages of the distribution functions, so the averages of the fitting function may be directly used as the estimated values of the corresponding parameters. When the estimation for the parameters of the equivalent stiffness modulus and the equivalent friction modulus with the largest probabilities is performed based on the semantic information of each raster after fusion, the mechanical characteristic parameters of the corresponding rasters may be obtained, so that the mechanical characteristic layers are formed after the estimation of the parameters for ground surface mechanical characteristics of all rasters is completed. Then, in combination of the geometric characteristic layers obtained in the step 2, the terrain model that fuses the terrain geometric characteristics and mechanical characteristics as shown in FIG. 1 is generated.

The embodiment of the present invention creatively characterizes the terrain from two dimensions of geometric characteristics and mechanical characteristics by means of layering, so as to divide the terrain into geometric characteristic layers and mechanical characteristic layers according to different presentations of the terrain elements. The terra-mechanical characteristic parameters are added into the terrain factors, so as to perform a simulation of planet rover's motion using wheel-ground interaction in simulation. In the present invention, the equivalent stiffness modulus $K_s$ and the equivalent friction modulus $\varphi$ are used to characterize pressure characteristics in normal direction and shear characteristics in tangential direction for the ground surface. Only using two parameters to uniformly characterize the mechanical characteristics of multiple terrains may meet the requirements for the characterization of the wheel-ground interaction model in different terrains.

The existing terrain characteristics perception commonly is that a body sensor is utilized to measure the force/torque of the wheels of the planet rover or the acceleration of the body for the determination of the characteristics such as slope, bump, etc. of the terrain on which the rover travels. However, for this sensing method based on the body signals, the signal may be obtained only when the terrain surface is traveled, thereby being difficult to predict terrain conditions in advance. In one embodiment of the present invention, the prediction of the terra-mechanical characteristics is performed by means of vision perception, wherein a bridge between the vision characteristics and the tactile characteristics is created through establishment of the terrain types and the corresponding terrain attribute table, so as to infer the pressure and shear characteristics for the ground surfaces of the regions which are not contacted, and to enlarge the perception range; with prediction of the equivalent stiffness modulus and equivalent friction modulus for the ground surfaces with a certain safety coefficient by the probability-related method, the original process of directly measuring the terra-mechanical characteristics through the body sensor may be indirectly performed by the characteristics prediction through an external vision sensor, thereby reducing potential risks for the planet rover caused by direct contact with unknown ground surfaces while broadening the sensing range.

Other embodiments of the present invention are given below to better describe the present invention.

Embodiment 2

The present embodiment is the same as Embodiment 1, except in that the terra-mechanical factors are expressed by $k_c$, $k_\varphi$, n in Bekker pressure characteristics model and c, $\varphi$, K in Janosi shear characteristics model. Among them, $k_c$, $k_\varphi$, n are expressed as the cohesive modulus, the friction modulus and the subsidence index; c, $\varphi$, K are expressed as the cohesion, the internal friction angle, and the shear modulus (of elasticity). Then, the terrain model is expressed as a finite sequence including nine terrain factors on a certain terrain region D:

$$\{C_i=(x_i,y_i,z_i,k_{ci},k_{\varphi i},n_i,c_i,\varphi_i,K_i), i=1,2,\ldots,N\}.$$

Similarly, the corresponding mechanical characteristic layer is also increased to six layers, and the number of geometric characteristic layers is unchanged.

Embodiment 3

The present embodiment is the same as Embodiment 1, except in that a binocular stereo camera is used to obtain the depth images. The image data flow is obtained by shooting the same environment through two 2D cameras that have been calibrated, a pixel stereo matching is performed on the content of the image frames obtained by the two cameras at the same time for depth calculation of the surrounding environment, so as the obtain the depth images.

Embodiment 4

The present embodiment is the same as Embodiment 1, except in that a structured-light-based camera is used to obtain the depth images. A projection device actively projects the structured light onto a detected object, the camera captures a three-dimensional light image formed on the detected object to collect phase information, then surface data of the detected object is obtained after processing with a calculation unit, so as to obtain the depth images.

Embodiment 5

The present embodiment is the same as Embodiment 1, except in that the semantic point clouds are obtained with a LiDAR and a color camera, wherein the LiDAR emits a laser light to a target region, which is received by a receiver, to obtain distance data of the target region, and point clouds with three-dimensional coordinate information may be obtained through processing, then through semantic segmentation for the color images, the point clouds with semantic information are generated with combination of coordinate transformation to point clouds.

Embodiment 6

The present embodiment is the same as Embodiment 1, except in that the semantic segmentation process takes RGB-D four-channel information as an input and contains depth information of the images. The convolutional neural network is trained with combination of color and depth images, and visually similar terrain regions with significant spatial differences are distinguished by means of the depth images, so as to further improve the effects of the terrain semantic segmentation.

Embodiment 7

Figure 9:
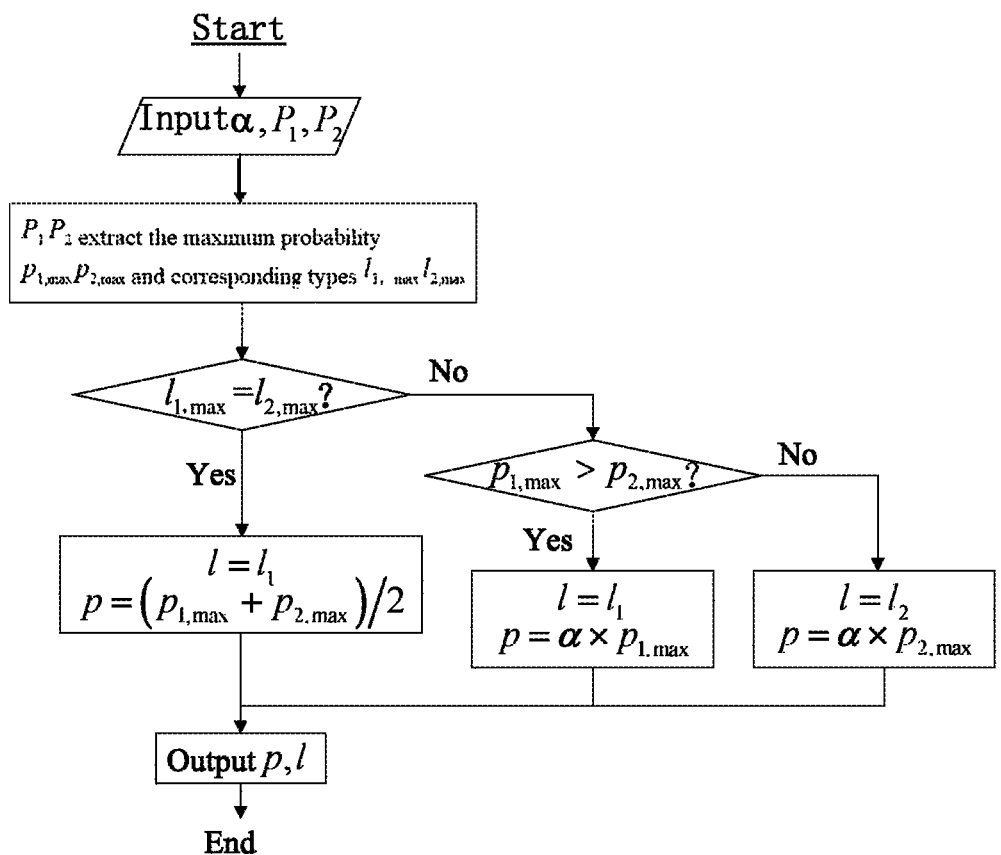
FIG. 9 is a flowchart of a semantic fusion method according to another embodiment of the present invention.

The present embodiment is the same as Embodiment 1, except in the data structure of the semantic point clouds and the corresponding semantic fusion method. The data structure of the semantic point clouds is shown in FIG. 7(*b*), and the semantic information only saves one type of terrain with the highest probability and its confidence. The corresponding semantic fusion method has a flow chart shown in FIG. 9, including: remaining the corresponding fused terrain types and a corresponding fused probability being an average of the two probabilities if the corresponding types of the maximum probability predicted by the two point clouds are the same; comparing the corresponding probabilities and remaining the terrain types with a larger probability as the fused type while updating the fusion probability to be a times the corresponding probability if the corresponding types of the maximum probability predicted by the two point clouds are different.

Embodiment 8

The present embodiment is the same as Embodiment 1, except in that in the process of inferring mechanical characteristics in the step S3, the estimated results of the equivalent stiffness modulus and equivalent friction modulus of the ground surfaces are directly obtained by weighting the characteristic values of the equivalent stiffness modulus and equivalent friction modulus of different terrain types according to the confidences of the terrain types. Specifically, the estimated values of the equivalent stiffness modulus and equivalent friction modulus are calculated as follows:

$$K_s = \sum_i c_i \mu_{K_s}^i, \varphi = \sum_i c_i \mu_{\varphi}^i;$$

wherein $c_i$ represents a probability corresponding to the i-th type terrain in the terrain semantic segmentation results, and $\mu_{K_s}^i$, $\mu_{\varphi}^i$ represent the equivalent stiffness modulus and the equivalent friction modulus corresponding to the i-th type terrain, respectively.

Embodiment 9

The present embodiment is the same as Embodiment 1, except in that the color images collected by the camera will undergo the terrain semantic segmentation, but end-to-end estimation of the terra-mechanical characteristics is directly performed for the color images, and pixel-level estimation values of terra-mechanical characteristics are obtained from each image. The geometric characteristic layer is also obtained by mapping the geometric information of the point clouds without semantic information, and then the terrain model that fuses the terrain geometric characteristics and mechanical characteristics is generated.

Figure 10:
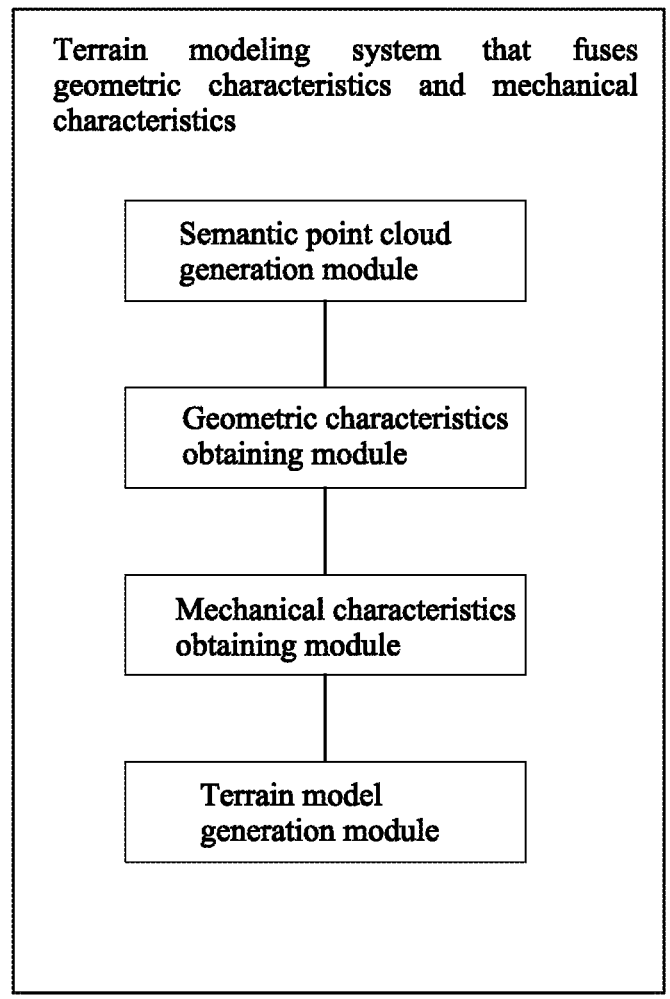
FIG. 10 is a block diagram of a terrain modeling system that fuses geometric characteristics and mechanical characteristics according to an embodiment of the present invention.

FIG. 10 is a block diagram of a terrain modeling system that fuses the terrain geometric characteristics and mechanical characteristics, including a semantic point cloud generation module, a geometric characteristics obtaining module, a mechanical characteristics obtaining module and a planet rover model generation module, wherein the semantic point cloud generation module is configured to obtain color images and depth images of the detected region, perform a terrain semantic segmentation on the color images, and fuse ground semantic information obtained by the semantic segmentation and depth information contained in the depth images at the same time to generate the semantic point clouds; the geometric characteristics obtaining module is configured to map the semantic point clouds to a raster map in a map coordinate system to generate corresponding rasters, and update elevation values in the semantic point clouds to the corresponding rasters; the mechanical characteristics obtaining module is configured to assign the semantic information in the semantic point clouds to the corresponding rasters, estimate terra-mechanical characteristics according to the semantic information, and assign estimation results to the corresponding rasters; and the planet rover model generation module is configured to generate a terrain model with combination of the results obtained from the geometric characteristics obtaining module and the mechanical characteristics obtaining module.

In the embodiments of the present invention, the terra-mechanical characteristics are taken as part of the terrain factors, and the terrain is characterized from two levels of the ground geometric characteristics and mechanical characteristics. Through path planning or motion control on the planet rover based on the generated terrain model, the planet rover may have better terrain adaptability, so as to give full play to its mobile performance and reduce subsidence caused by non-geometric characteristics of the ground surfaces.

The present invention further provides a computer readable storage medium having stored therein a computer program that, when read and executed by a processor, causes the above terrain modeling method that fuses geometric characteristics and mechanical characteristics to be performed.

The present invention still further provides a terrain modeling system, including a memory, a processor, and a computer program stored on the memory and executable on the processor. When the computer program is executed by the processor, it causes the above terrain modeling method that fuses geometric characteristics and mechanical characteristics to be performed.

In the description of the present specification, descriptions with reference to the term "one embodiment", "some embodiments", "an example", "specific example", or "some examples" and the like mean that specific features, structures, materials, or characteristics described in conjunction with the embodiments or examples are included in at least one embodiment or example of the present invention. In the present specification, the schematic representation of the above terms does not necessarily mean the same embodiment or example. Furthermore, the particular features, structures, materials, or features described may be combined in a suitable manner in any one or more embodiments or examples. In addition, various embodiments or examples described in the specification, as well as features of various embodiments or examples, may be combined and combined by those skilled in the art without contradicting each other.

The above descriptions are merely preferred embodiments of the present invention, and are merely illustrative and not restrictive for the present invention. Those skilled in the art understand that many changes, modifications, and even equivalents can be made within the spirit and scope defined by the claims of the present invention, but all fall within the protection scope of the present invention.

What is claimed is:

1. A terrain modeling method that fuses geometric characteristics and mechanical characteristics, comprising steps of:

obtaining input images of a detected region, and processing the input images to generate point clouds comprising elevation values of the input images;

wherein the step of obtaining the input images of the detected region and processing the input images to generate point clouds comprises:

obtaining color images and depth images of the detected region, performing a terrain semantic segmentation on the color images, and fusing ground semantic information obtained by the semantic segmentation and depth information contained in the depth images at the same time to generate the point clouds;

mapping the point clouds to a raster map in a map coordinate system to generate corresponding rasters, and updating the elevation values to the corresponding rasters; and calculating the input images in terms of terra-mechanical characteristics, and updating calculation results to the corresponding rasters to generate a terrain model.

2. The terrain modeling method that fuses geometric characteristics and mechanical characteristics according to claim 1, wherein the step of performing a terrain semantic segmentation on the color images comprises:

collecting terrain images as a data source, annotating a target terrain in the collected terrain images and generating corresponding mask labels, and randomly dividing the annotated terrain images into training sets and validation sets in proportion;

calculating a mean and a variance of three RGB channels of the training sets, respectively, performing a data normalization on each of the input images, performing a data enhancement on original images in the training sets, and correcting the corresponding mask labels; and constructing a convolutional neural network, performing a training on a semantic segmentation model, and selecting a model with the highest accuracy as the semantic segmentation model for performing the terrain semantic segmentation on the color images.

3. The terrain modeling method that fuses geometric characteristics and mechanical characteristics according to claim 1, wherein the semantic information comprises a plurality of terrain types with a higher confidence obtained after the terrain semantic segmentation and corresponding probabilities.

4. The terrain modeling method that fuses geometric characteristics and mechanical characteristics according to claim 1, wherein the step of fusing ground semantic information obtained by the semantic segmentation and depth information contained in the depth images at the same time to generate the semantic point clouds comprises:

combining the semantic information of each pixel in the color images with the depth information contained in the depth images at the same time; and performing a coordinate transformation using pose information of a camera carried by a planet rover to generate the semantic point clouds in the map coordinate system.

5. The terrain modeling method that fuses geometric characteristics and mechanical characteristics according to claim 4, wherein the step of performing a coordinate transformation using pose information of a camera carried by a planet rover to generate the semantic point clouds in the map coordinate system comprises:

mapping three-dimensional point clouds in a depth camera coordinate system to a color camera coordinate system at the same time to form color three-dimensional point clouds in the color camera coordinate system; and transforming the color three-dimensional point clouds into the map coordinate system via a planet rover base coordinate system.

6. The terrain modeling method that fuses geometric characteristics and mechanical characteristics according to claim 5, wherein the color camera coordinate system and the depth camera coordinate system are fixedly connected to a planet rover body, and the planet rover base coordinate system changes with changes in poses of the planet rover and has a projection of a coordinate origin on an XY plane of the map coordinate system coinciding with a origin of the map coordinate system.

7. The terrain modeling method that fuses geometric characteristics and mechanical characteristics according to claim 1, wherein the step of mapping the point clouds to a raster map in a map coordinate system to generate corresponding rasters, and assigning the elevation values to the corresponding rasters comprises:

updating the elevation values and the semantic information contained in the rasters through a data fusion when the point clouds at different times correspond to the same raster.

8. The terrain modeling method that fuses geometric characteristics and mechanical characteristics according to claim 7, wherein the elevation values are updated by obtaining an average value of the elevation values contained in the plurality of point clouds.

9. The terrain modeling method that fuses geometric characteristics and mechanical characteristics according to claim 7, wherein the step of updating the semantic information through a data fusion comprises:

updating the terrain types contained in the plurality of point clouds and the probabilities through Bayesian updating rule.

10. The terrain modeling method that fuses geometric characteristics and mechanical characteristics according to claim 7, wherein the step of updating the semantic information through a data fusion comprises:

remaining the updated terrain types and a corresponding updated probability being an average of the two probabilities if the corresponding types of the maximum probability of the two semantic point clouds are the same; and remaining the terrain types with a larger probability as the updated terrain types and a corresponding updated probability being a times the corresponding larger probability if the corresponding types of the maximum probability of the two semantic point clouds are different.

11. The terrain modeling method that fuses geometric characteristics and mechanical characteristics according to claim 1, wherein the step of estimating the input images in terms of terra-mechanical characteristics, and updating calculation results to the corresponding rasters to generate a terrain model comprises:

fitting a distribution function according to statistical data of the terra-mechanical characteristics; and performing a numerical estimation of the terra-mechanical characteristics with safety factors in combination with the semantic information, and assigning estimation results to the corresponding rasters to generate the terrain model.

12. The terrain modeling method that fuses geometric characteristics and mechanical characteristics according to claim 11, wherein the step of performing a numerical calculation of the terra-mechanical characteristics with safety factors in combination with the semantic information comprises:

calculating safety factors $S(K_s)$ of equivalent stiffness modulus $K_s$ and safety factors $S(\varphi)$ of equivalent friction modulus $\varphi$, respectively:

$$S(K_s) = \sum_i c_i F_i(K_s), \ S(\varphi) = \sum_i c_i F_i(\varphi);$$

wherein ci represents a confidence level corresponding to the i-th terrain category in the terrain semantic segmentation results, Fi(Ks) represents a cumulative distribution function of the equivalent stiffness modulus, and Fi(φ) represents a cumulative distribution function of the equivalent friction modulus.

13. The terrain modeling method that fuses geometric characteristics and mechanical characteristics according to claim 1, wherein the step of estimating the input images in terms of terra-mechanical characteristics, and updating calculation results to the corresponding rasters to generate a terrain model comprises:

fitting a distribution function according to statistical data of the terra-mechanical characteristics; and performing a weighted calculation of values of the equivalent stiffness modulus and equivalent friction modulus of different terrain types according to the corresponding probabilities of the terrain types, and assigning calculation results to the corresponding rasters to generate the terrain model.

14. The terrain modeling method that fuses geometric characteristics and mechanical characteristics according to claim 1, wherein the step of estimating the input images in terms of terra-mechanical characteristics, and updating calculation results to the corresponding rasters to generate a terrain model comprises:

fitting a distribution function according to statistical data of the terra-mechanical characteristics; and using a mean obtained by fitting as estimation values of the equivalent stiffness modulus and equivalent friction modulus, and assigning the estimation values to the corresponding rasters to generate the terrain model.

15. The terrain modeling method that fuses geometric characteristics and mechanical characteristics according to claim 1, wherein the step of processing the input images comprises:

collecting terrain images as a data source, annotating a target terrain in the collected terrain images and generating corresponding mask labels, and randomly dividing the annotated terrain images into training sets and validation sets in proportion;

calculating a mean and a variance of four RGBD channels in the training sets obtained after combination of the color images and the depth images, respectively, performing a data normalization on each of the input images, and performing an enhancement on original images in the training sets while correcting the corresponding mask labels; and constructing a convolutional neural network, performing a training on a semantic segmentation model, and selecting a model with the highest accuracy as the semantic segmentation model for performing a terrain semantic segmentation on the input images.

16. The terrain modeling method that fuses geometric characteristics and mechanical characteristics according to claim 1, wherein the step of processing the input images to generate point clouds comprises:

emitting a laser light to a target region and receiving through a receiver to obtain point cloud data of the target region with three-dimensional coordinate information, and obtaining color images of the target region for combining with the point cloud data via coordinate transformation through semantic segmentation to generate the point clouds.

17. The terrain modeling method that fuses geometric characteristics and mechanical characteristics according to claim 1, wherein the step of obtaining input images of a detected region and processing the input images to generate point clouds comprises:

obtaining color images and depth images of the detected region, and combining the color images with the depth images at the same time to generate the point clouds via coordinate transformation.

18. A computer readable storage medium having stored therein a computer program that, when read and executed by a processor of a computer, causes the computer to perform a terrain modeling method that fuses geometric characteristics and mechanical characteristics to execute:

obtaining input images of a detected region, and processing the input images to generate point clouds comprising elevation values of the input images;

wherein the step of obtaining the input images of the detected region and processing the input images to generate point clouds comprises:

obtaining color images and depth images of the detected region, performing a terrain semantic segmentation on the color images, and fusing ground semantic information obtained by the semantic segmentation and depth information contained in the depth images at the same time to generate the point clouds;

mapping the point clouds to a raster map in a map coordinate system to generate corresponding rasters, and updating the elevation values to the corresponding rasters; and calculating the input images in terms of terra-mechanical characteristics, and updating calculation results to the corresponding rasters to generate a terrain model.

* * * * *